United States Patent Office 3,717,039
Patented Feb. 20, 1973

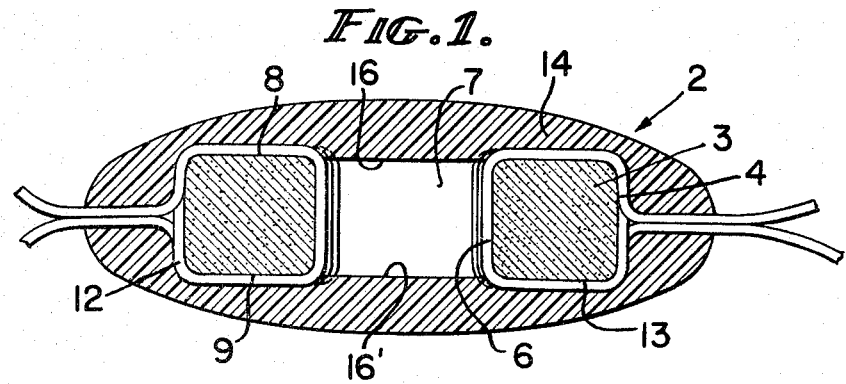
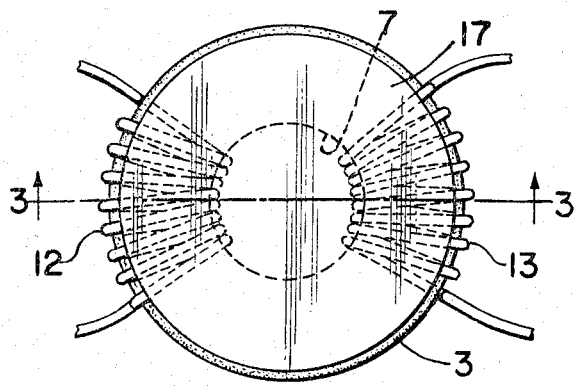
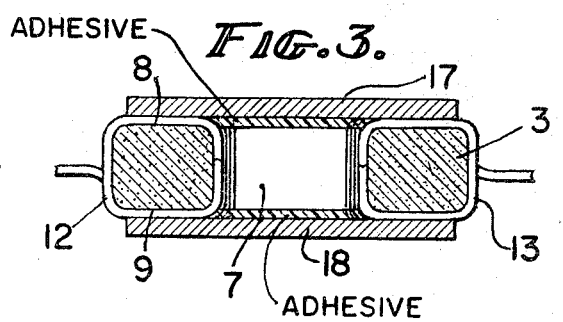
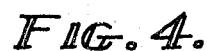
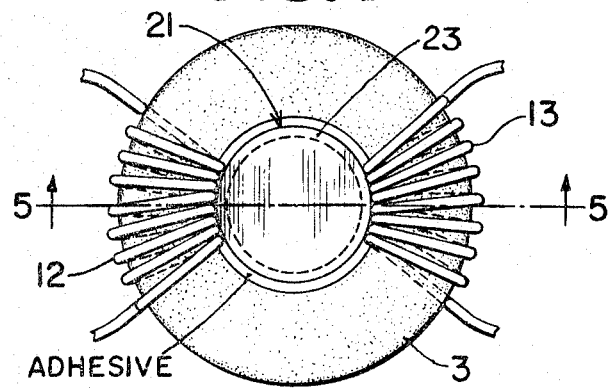
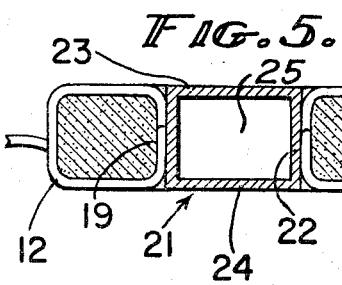
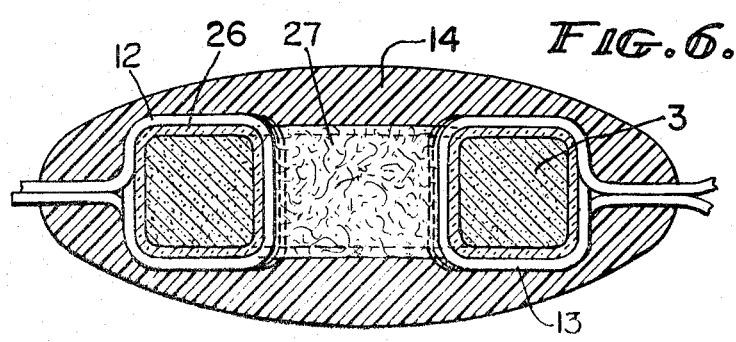

3,717,039
METHOD AND MEANS FOR AMPLIFYING THE STRESS AND STRAIN IN A STRESS-SENSITIVE COMPONENT
Norman Zinker, Santa Clara, Calif., assignor to International Technical Industries, Santa Cruz, Calif.
Filed Aug. 4, 1969, Ser. No. 847,192
Int. Cl. G01l 9/16
U.S. Cl. 73—398 R
1 Claim

ABSTRACT OF THE DISCLOSURE

Presented is a transducer assembly including a stress-sensitive body conditioned to render additive the radial and tangential stresses imposed on the body.

BACKGROUND OF INVENTION

Transducers are used in modern technology for many purposes. For instance, transducers have been utilized in various types of listening devices to convert vibrations set up by various sounds into electrical signals that may be transmitted over long distances. Transducers have also been immersed in various types of pneumatic and hydraulic media for the purpose of detecting static and dynamic pressures in such media. Most such transducers for measurement of variations in pressure in a given media lack sensitivity for measuring variations at low pressure levels. Accordingly, it is one of the objects of the present invention to provide a transducer assembly conditioned for low pressure sensitivity.

It has been discovered that under certain circumstances a modification of the configuration of a body sensitive to associated stimuli results in the radial and tangential stresses imposed on that body by the associated stimuli being rendered additive. Accordingly, it is another object of this invention to modify the configuration of a stress-sensitive body in such a manner that the radial and tangential forces imposed on the body are rendered additive.

With respect to a toroidal magnetostrictive core formed as an isotropic homogeneous elastic body, the subjection of such body to hydrostatic pressure will impose constant compressive stress at every point in the body, and will impose no tangential or shear stresses being present. See "Mathematical Theory of Elasticity," McGraw-Hill, 1956 by I. S. Sokolnikoff. It is one of the objects of the present invention to modify the configuration of such a toroidal magnetostrictive core so that to such compressive or radial stresses, there is added a tangential or shear stress which increases the sensitivity of the core to external stimuli such as hydrostatic or other pressures.

U.S. Pat. 3,307,405 teaches the use of a toroidal magnetostrictive core member which has been rendered sensitive to variations in pressure at high levels by conditioning the toroidal core member by raising the Curie point to a level of approximately 750° C. It is one of the objects of this invention to condition a pressure transducer (which may include a toroidal magnetostrictive ferrite core) in a manner to increase its sensitivity to variations of pressure at low pressure levels without regard to the Curie temperature of the material.

A still further object of the invention is to provide a method by which a body (such as a magnetostrictive or piezoelectric body) that is stress-sensitive may be rendered more sensitive by at least an order of magnitude by conditioning the stress-sensitive body so that radial and tangential stresses imposed thereon are additive.

In conjunction with magnetostrictive ferrimagnetic core members with a toroidal configuration it has been found that such core members are rendered extra sensitive to variations in pressure at low pressure levels if the core is conditioned so that radial and tangential stresses generated therein are additive. It has also been found that such conditioning may be accomplished by closing the opening through the toroidal body at opposite ends to define a closed void within the body. Accordingly, it is a still further object of the invention to provide a method and means for achieving such increased sensitivity in a toroidal ferrimagnetic core member by closing opposite ends of the opening through the body so that radial and tangential stresses imposed on the body are rendered additive. A still further object of the invention is to effect such conditioning by modifying the configuration of the stress-sensitive body through application of a coating thereto applied in a manner to close opposite ends of the opening while leaving a void therewithin.

BRIEF SUMMARY OF INVENTION

In terms of broad inclusion, for purposes of illustration and disclosure, the invention has been disclosed as embodied in a transducer assembly including a stress-sensitive body formed from magnetostrictive material in a toroidal configuration. Appropriate primary and secondary windings for generating magnetic flux in the stress-sensitive body and for monitoring variations in such magnetic flux resulting from variations in the cross-sectional area or magnetic permeability of the stress-sensitive body, induced by variations in force imposed by the medium in which the stress-sensitive body is contained, are operatively associated with the stress-sensitive body.

Means are provided also operatively associated with the stress-sensitive body effective to render the radial and tangential stresses imposed on the body additive to effect amplification of the strains or deformation caused in said body by the stresses applied. Such means may constitute any means, such as a coating, for example, applied in any manner which will cause radial and tangential stresses imposed on the stress-sensitive body to be additive. In one aspect of the invention such means constitutes a coating in the form of an encapulant defining a hollow shell surrounding the stress-sensitive body in a manner to close the opposite ends of the hole through the toroidal body. In another aspect of the invention such means for amplifying the effect of stresses imposed on the stress-sensitive body comprises spaced plates applied to the transverse ends of a toroidal core member in a manner to define a closed void within the toroidal core member. In still another aspect of the invention the means applied to a magnetostrictive stress-sensitive body having a toroidal configuration may constitute a plug inserted into the inner periphery of the toroidal member so as to define a void therewithin which as with the coating and end plates effectively prevents the application of external stimuli to the inner periphery of the toroidal core member.

The term "additive" used herein with respect to the radial and tangential stresses is intended to include a vector addition of all of the radial and tangential stresses applied to the stress sensitive body. The result of these stresses is increased because of the conditioning of the stress sensitive body which prevent the application of any exernal stresses to portions of the stress sensitive body. The tangential stresses are the stresses applied to the stress sensitive toroidal body in a direction parallel to the axis of said toroid, while the radial stresses are the stresses applied to the toroidal body in a direction perpendicular to the axis of the toroid.

DESCRIPTION OF DRAWINGS

FIG. 1 is a vertical cross-sectional view through a preferred embodiment of the invention in which a magnetostrictive core member having a toroidal configuration is encapsulated in a manner to create a closed void within the stress-sensitive body.

FIG. 2 is a plan view of a different embodiment of the invention.

FIG. 3 is a vertical cross-sectional view taken in the plane indicated by the line 3—3 in the embodiment illustrated in FIG. 2.

FIG. 4 is a plan view of a third embodiment of the invention.

FIG. 5 is a vertical cross-sectional view taken in the plane indicated by the line 5—5 in FIG. 4.

FIG. 6 is a vertical cross-sectional view of a fourth embodiment of the invention.

DESCRIPTION OF PREFERRED EMBODIMENT

Figure 7:
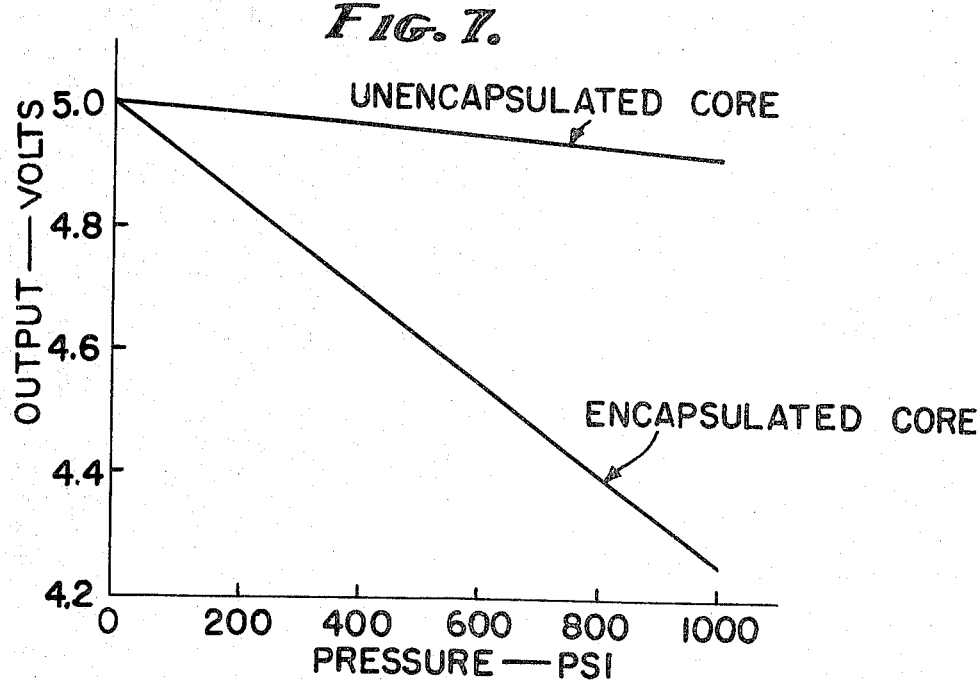
FIG. 7 is a plot of the output voltage as a function of pressure applied over a relatively low range, and comparing such output secured from a transducer assembly conditioned in accordance with the instant invention with a transducer assembly of conventional design.

In terms of greater detail, for purposes of illustration the invention will be described in connection with its application to a stress-sensitive body in the form of a magnetostrictive body having a toroidal configuration. It should be understood however that the invention may be implemented utilizing other stress-sensitive bodies, materials and configurations.

Referring specifically to FIG. 1, the preferred embodiment there shown comprises a transducer assembly designated generally by the numeral 2, and includes a magneto-strictive stress-sensitive body 3 having a toroidal configuration including an outer periphery 4 and an inner periphery 6, the inner periphery defining a central bore 7 extending from one lateral surface 8 of the toroidal body to the opposite lateral surface 9 thereof. The magnetostrictive body 3 may conveniently be formed from a ferrimagnetic nickel-ferrite material such as taught by U.S. Pat. 3,307,405. It should be understood that other magnetostrictive and non-magnetostrictive but stress-sensitive materials may be used to good advantage.

Appropriately wound on the toroidal stress-sensitive body 3 is a primary winding 12 consisting of a plurality of turns of an insulated electrically conductive wire the ends of which are connected to an appropriate source of electrical current (not shown). Magnetic flux is generated in the stress-sensitive body when current is circulated through the primary winding 12. Also appropriately wound on the stress-sensitive body 3 is a secondary winding 13 including a plurality of turns that are coupled magnetically to the magnetic flux generated in the stress-sensitive body by the flow of current in the primary winding. This combination operates in a well-known manner to generate magnetic flux in the stress-sensitive body, the density of such flux being a function of the cross-sectional area of the body. When associated stimuli in the form of hydrostatic, dynamic or point-to-point pressure or force is applied to the body a change in the cross-sectional area is effected, with a resultant change in the density of magnetic flux. The secondary winding 13 detects such variations in magnetic flux through magnetic coupling of the winding with the magnetic flux and channels the resultant signals to an appropriate amplifier which forms no part of this invention and is therefore not shown.

It has been found that by changing the configuration of the stress-sensitive body illustrated in FIG. 1 by surrounding the toroidal body with a body or coating of encapsulating material 14, forces which would normally be imposed directly upon the stress-sensitive body are imposed first on the body of encapsulating material. The body of encapsulating material functions to collect such forces and transmit them directly to selected surfaces of the stress-sensitive body with which the encapsulant is in intimate contact as shown. Such body of encapsulating material also provides end walls 16 and 16′ closing opposite ends of the bore 7 through the body but being excluded from the interior of the bore as shown. There is thus formed a closed void within the confines of the body, with the result that the imposition of an external force on the stress-sensitive body will cause the radial and tangential stresses generated in the body by such external force to be additive in nature, thus effecting an amplification of the strain or deformation in the body that would normally be expected.

In the embodiment illustrated in FIG. 1, the encapsulating body 14 is conveniently in the form of a tear drop, but it has been found that other shapes are also effective so long as end walls 16 and 16′ are provided closing opposite ends of bore 7 through the body. Thus, elliptical, round, spherical and rectangular configurations may be used. The encapsulating material may also be any one of a number of different materials, including ceramic, metal, non-metals, and combinations of ceramics, metals and non-metals. Specifically, synthetic resinous materials of both thermoplastic and thermosetting types are effective. Additionally, self-polymerizing synthetic resinous materials and heat-hardenable materials such as aluminum oxide may be used. These materials may be applied by various methods including spraying, daubing, dipping, evaporation, electrostatic deposition and vacuum plating.

In the embodiment illustrated in FIGS. 2 and 3, the stress-sensitive toroidal body 3 is provided on its opposed lateral surfaces 8 and 9, respectively, with plates 17 and 18 secured to the associated surfaces of the stress-sensitive body by suitable adhesive means to effect efficient transmission of external stimuli through the plates 17 and 18 and into the toroidal body. For this purpose a thin film of epoxy-type adhesive may be utilized. As with the embodiment illustrated in FIG. 1, it is important in the embodiment illustrated in FIG. 3 that the bore 7 formed through the stress-sensitive body be closed at opposite ends by the plates 17 and 18 so that the inner periphery of the body is shielded from the direct application of external stimuli. It is also desirable that plates 17 and 18 have a thickness such that a minimum of flexure inwardly of the bore 7 will occur upon application of external stimuli on the body.

The embodiment of the invention illustrated in FIGS. 4 and 5 emphasizes the need for closing opposite ends of the bore 7 defined by the inner periphery 6 of the magneto-strictive stress-sensitive body 3 having a toroidal configuration. In this embodiment, such closing of the bore 7 is accomplished by an insert designated generally by the numeral 21. The insert is preferably formed from a material having a thermal coefficient of expansion and contraction compatible with such characteristics in the stress-sensitive body. It is preferably cemented or otherwise caused to rigidly adhere to the inner peripheral surface of the body. For this purpose, the insert is provided with a cylindrical wall 22, closed at opposite ends by end walls 23 and 24. It will thus be seen that there is formed a closed void 25 within the confines of the stress-sensitive body so that any forces applied to the external surfaces of the stress-sensitive body will not be applied to the inner peripheral surfaces thereof, with the result that radial and tangential stresses generated in the body of the magnetostrictive material by imposition of such forces will be rendered additive.

Magnetostrictive ferrimagnetic core members manufactured for the purpose disclosed are frequently no larger than .050″ in outside diameter with an internal diameter of perhaps half that amount or .025″. Ferrimagnetic cores of this size, by virtue of the nature of the material, are apt to be abrasive. Since the coil windings wound on the toroidal ferrimagnetic core member are of extremely small diameter, in the order of 40- to 60-gauge, it is important that the fragile insulation carried by such delicate wires not be ruptured during application to the core member, nor ruptured as a result of expansion and contraction of the core member in response to external stimuli.

Accordingly, in the embodiment of the invention illustrated in FIG. 6, the stress-sensitive body 3 has been provided with an extremely thin layer 26 of a material such as glass or ceramic which effectively provides a smooth surface about the core member to prevent the coil wire from being abraded either during application or during use of the device. It will of course be understood that other materials besides glass may be utilized. After application of such smooth layer of material, and after application of the secondary and primary windings, the stress-sensitive body is encapsulated in the manner previously discussed. In FIG. 6, such encapsulation may take the form of the body 14 of encapsulating material similar to the method and means discussed in connection with FIG. 1.

In the embodiment illustrated in FIG. 6, the bore 7 has been filled with a loosely packed fibrous material 27 having a high degree of resilience. Such packing facilities exclusion of encapsulant from the bore 7, and does not detract significantly from the effectiveness of the encapsulant in the performance of its intended function.

While the invention has been disclosed and illustrated in connection with a stress-sensitive body in the form of a magnetostrictive toroidal core member, it should be understood that the invention in its broadest aspect involves conditioning the stress-sensitive body by a method and/or means which will have the effect of amplifying the effect of externally applied forces or stresses on the body by rendering the radial and tangential stresses generated in such body by externally applied forces additive. For a toroidal body as illustrated, such conditioning in its broadest aspect involves closing opposite ends of the bore 7 through the body so that externally applied stimuli will not be applied to the internal peripheral surface of the stress-sensitive body, thus effectively insuring that all radial and tangential stresses generated in the body will be additive.

Figure 8:
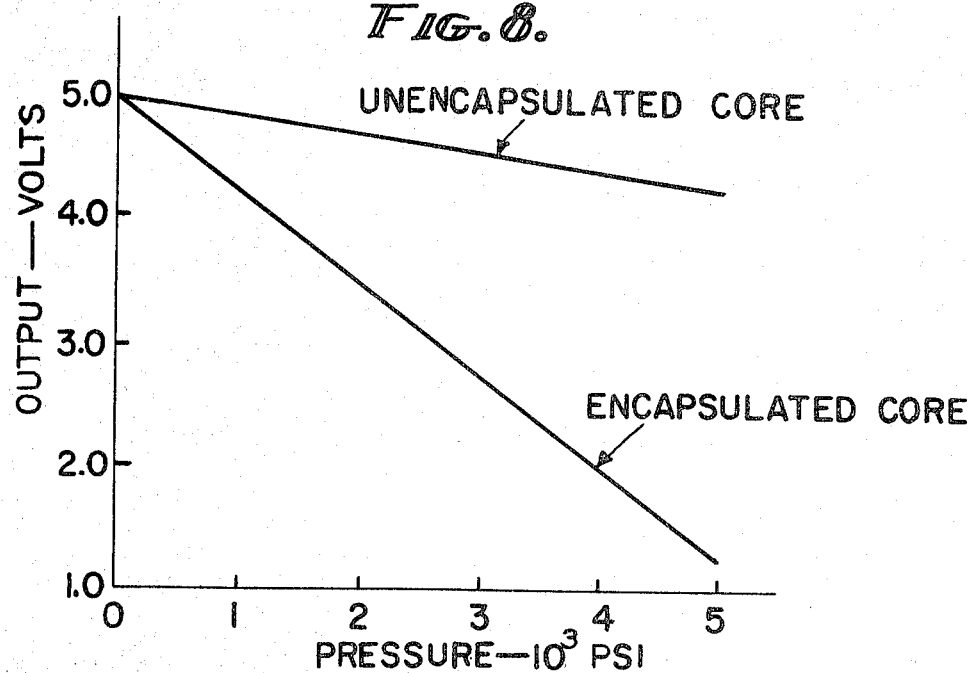
FIG. 8 is a plot of the output voltage as a function of pressure applied over a relatively high range, and comparing such output secured through implementation of the subject invention with the output secured from a conventional transducer assembly.

The effect of such conditioning is graphically illustrated in FIGS. 7 and 8, which illustrate for comparison purposes curves generated by the application of pressure to transducer assemblies in accordance with the present invention and as applied to a conventional transducer assembly. As illustrated in both figures, for the conventional magnetostrictive core a range of relatively low pressures between 0 and 1000 pounds per square inch (FIG. 7) results in a relatively small variation in the output voltage. Over the same pressure range, a magnetostrictive core conditioned in accordance with this invention exhibits a much greater fluctuation in output voltage, thus increasing the accuracy with which the external stimuli may be measured.

A comparison of the applied pressures in FIGS. 7 and 8 demonstrates the broad applicability of magnetostrictive core members conditioned in accordance with this invention to a wide spectrum of pressures. For instance, in the plot illustrated in FIG. 8, it is shown that a conventional magnetostrictive core subjected to pressures between 0 and 5000 pounds per square inch exhibits little fluctuation in output voltage. By contrast, a magnetostrictive core member conditioned in accordance with the present invention subjected to the same pressure range exhibits a much broader fluctuation in output voltages. The significance of such comparison illustrates that transducer assemblies incorporating a stress-sensitive body conditioned in accordance with the present invention are applicable in many different applications involving wide disparities between applied pressures.

Having thus described my invention, what is claimed to be novel and sought to be protected by Letters Patent is as follows:

1. The method of increasing the sensitivity to externally applied pressure of a transducer assembly including a stress sensitive body, comprising conditioning the body to render radial and tangential stresses imposed on said body additive, said stress sensitive body being formed from a magnetostrictive nickel-ferrite material having a toroidal configuration defining a bore through said body, said conditioning constituting closing opposite ends of said bore to thereby isolate the bore from external pressure.

References Cited

UNITED STATES PATENTS

| Re. 26,739 | 12/1969 | Stucki | 73—398 |
| 3,103,810 | 9/1963 | Agerman et al. | 73—141 |
| 3,108,649 | 10/1963 | Hamilton | 177—208 |
| 3,138,775 | 6/1964 | Sullivan et al. | 338—2 |
| 3,168,830 | 2/1965 | Chass | 73—398 |
| 3,248,936 | 5/1966 | Shih Y Lee et al. | 73—141 |
| 3,299,382 | 1/1967 | Takashi Tanaka | 336—20 |
| 3,411,361 | 11/1968 | McLellan | 73—398 |
| 3,424,007 | 1/1969 | Pasnak et al. | 73—398 |
| 3,448,607 | 6/1969 | Russell | 73—88.5 |
| 2,873,341 | 2/1959 | Kutsay | 338—6 |
| 2,948,872 | 8/1960 | Beckman | 338—3 |
| 3,358,257 | 12/1967 | Painter et al. | 338—5 |
| 2,761,077 | 8/1956 | Harris | 340—11 X |

FOREIGN PATENTS

| 150,672 | 12/1961 | U.S.S.R. | 73—133 B |
| 1,058,595 | 2/1967 | Great Britain | 73—88 E |

CHARLES A. RUEHL, Primary Examiner

U.S. Cl. X.R.

73—88 E, DIG. 2; 310—26